*Inventor*
E.P.G. WRIGHT - D.S.RIDLER -
R.GRIMMOND
*By* [signature]
*Attorney*

Aug. 7, 1962 E. P. G. WRIGHT ET AL 3,048,827

INTELLIGENCE STORAGE EQUIPMENT WITH INDEPENDENT RECORDING AND READING FACILITIES

Filed Jan. 11, 1956 3 Sheets-Sheet 2

Inventor
E.P.G. WRIGHT - D.S. RIDLER - R. GRIMMOND
By [signature]
Attorney

Inventor
E.P.G. WRIGHT - D.S. RIDLER -
R. GRIMMOND
By [signature]
Attorney

United States Patent Office 3,048,827

Patented Aug. 7, 1962

3,048,827

INTELLIGENCE STORAGE EQUIPMENT WITH INDEPENDENT RECORDING AND READING FACILITIES

Esmond Philip Goodwin Wright, Desmond Sydney Ridler, and Robert Grimmond, London, England, assignors to International Standard Electric Corporation, New York, N.Y.

Filed Jan. 11, 1956, Ser. No. 558,563
Claims priority, application Great Britain Jan. 14, 1955
12 Claims. (Cl. 340—174)

The present invention relates to data processing equipment.

According to the present invention there is provided data processing equipment which comprises a number of groups of storage elements in one of which groups a word presented to all of said groups in parallel can be recorded by energising a control wire individual to the group in which said recording is to be effected, the storage elements of that group each being in a state characteristic of one of the digits of the word to be recorded after the energisation of said control wire, a distributor having a unit for each group of storage elements, each said unit being associated with one of said control wires, the operated unit of said distributor corresponding to the group of storage elements in which the next received word is to be recorded, and means responsive to reception of a word to cause said distributor to energise the control wire corresponding to the group of storage elements in which said word is to be recorded and simultaneously to transfer the operated condition in said distributor to the unit thereof corresponding to the group of storage elements in which the next word is to be recorded.

According to the present invention there is further provided data processing equipment which comprises a number of storage elements in which intelligence can be recorded as either one of two stable states, which storage elements form a number of groups in each of which a word may be recorded, means for recording a word in one of said groups of storage elements by applying electrical energy to the storage elements of that group such that each element of the group is in the appropriate state for the word to be recorded after the application of said energy, a distributor of which only one unit at a time can remain operated and which has a unit for each group of storage elements, the operated unit of said distributor corresponding to the group of storage elements in which the next received word is to be recorded, and means responsive to reception of a word to be recorded to cause said recording means to record that word in the group of storage elements corresponding to the operated unit of said distributor and simultaneously to transfer the operated condition in said distributor to the unit corresponding to the group of storage elements in which the next word is to be recorded.

According to the present invention there is still further provided data processing equipment which comprises a number of groups of storage elements in one or more of which groups words are recorded, the storage elements of each group in which a word is recorded being in that one of two states which characterises one of the digits of that word, means for reading a recorded word by energising a reading control wire individual to the group of storage elements from which the word is to be read, which energisation causes an output pulse to be produced from each storage element which is in one of said states when said energisation occurs and substantially no output from each storage element which is in the other of said states when said energisation occurs, the combination of output pulses produced as a result of said energisation forming the reading output, a reading distributor having a unit for each group of storage elements, each said unit being associated with one of said reading control wires, the operated unit of said reading distributor corresponding to the next group of storage elements to be read, and means responsive to reception of a reading signal to energise the control wire corresponding to said group of storage elements to be read and simultaneously to transfer the operated condition of said distributor corresponding to the group of storage elements to be read in response to the next reading signal.

The term "word" as used in the above paragraph and in the specification and claims means an ordered set of characters having a meaning and considered as a unit.

The invention will now be described with reference to the accompanying drawings of an embodiment thereof, in which.

*Brief Description*

This equipment receives and stores a "block" of data consisting of a number of "words" each of which is received in binary code in parallel-fashion, i.e. over a number of channels equal to the number of elements in the word. This block of data is stored, and then read out, either immediately or subsequently, at a predetermined rate which might be different from the rate at which it is stored. The recording and reading means are entirely separate so that both processes can be in progress concurrently. These functions are each controlled by a separate static magnetic distributor. The operation of the matrix and of the distributor will first be described.

*The Storage Matrix (FIG. 2)*

This consists of a co-ordinate array of ferro-magnetic storage elements, each of which can be a single ferro-magnetic core or the ferrite surrounding a small hole in a piece of ferrite, as in the co-pending application Serial No. 492,982, March 8, 1955, now Patent No. 2,952,840. Each element is threaded by four wires, each of which acts as a winding on the core concerned. The material used for the storage elements has a hysteresis loop which approximates to a rectangle, so that an element can be set to either one of two stable magnetic states, which will be designated positive and negative magnetisation respectively.

Figure 2:
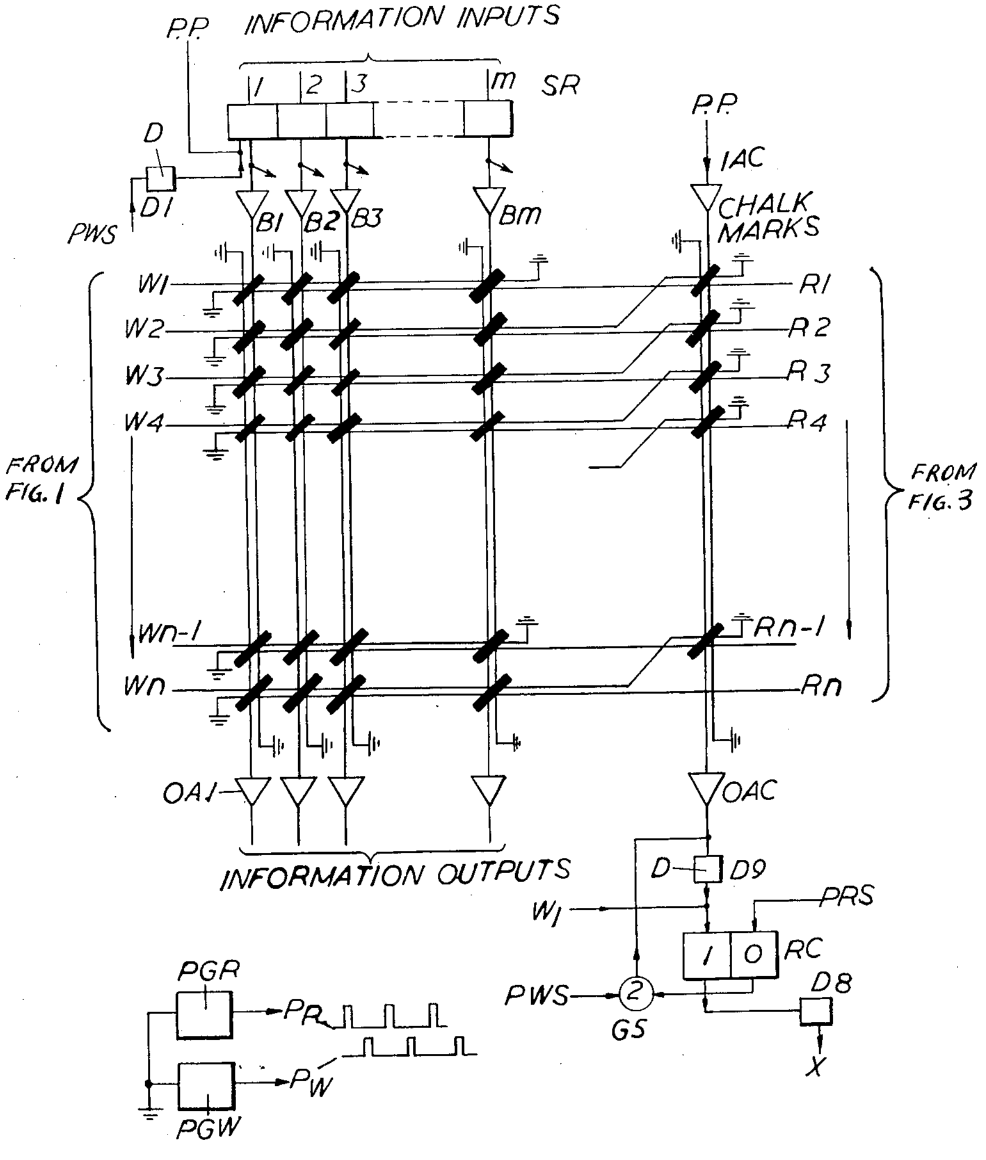
FIG. 2 shows a ferro-magnetic storage matrix.

In the circuit of FIG. 2, to store data the distributor applies a current pulse to the wire such as W1 threading the row of elements in which recording is to be effected. This pulse is of such a polarity as to drive the elements to positive magnetisation, but of half the amplitude necessary to do this. The second of the wires threading each of the elements is one of the bias wires B*l* to B*m* respectively, each of which passes through all of the elements in a column of elements. When a word is to be stored, a combination of the wires B1 to B*m* will be energised, each energised wire representing a binary one or a mark element and each non-energised wire representing a binary zero or a space element. As in the case of the "row" winding the energisation is such as to drive the elements positive but only half the size necessary. All those elements which have both recording wires simultaneously energised are set to the positive state. Thus one whole row of elements are set to record the word, herein assumed to be a binary number, represented by the energisations on the wires B1 to B*m*. Each row of storage elements therefore forms a group in which one word is recorded. At the same time as a word is recorded in a row of storage elements the distributor moves on so that the next word will be recorded in the next row of elements.

For reading, each element has two wires, one of which is energised to drive the element to its negative state, the current applied thereto being large enough to do this. The other is an output wire. A reading distributor, which steps from output to output at a predetermined rate in response to signals from a source of reading signals, energises the reading windings of the elements row by row, and each element in the row being pulsed in which "one" or mark is recorded is changed from positive to negative magnetisation, thus producing a relatively large pulse on its output lead. The elements storing zero are not changed and so produce a relatively small pulse. Each output lead is connected to an amplifier, such as OA1 for column 1, which only gives an output pulse when "one" is read. Hence when a row of elements is pulsed from the reading distributor the word stored therein is read out parallel-wise. As will be seen, the distributor is set to its next position at the same time.

The right-hand column of storage elements are known as "chalk mark" elements, and it will be seen that the recording control winding of a chalk-mark element is connected to the "row" control windings for the next row of elements. The winding is so proportioned for each of these additional or chalk-mark elements that the pulse on the row windings can set a chalk-mark element to its positive state. The result of the staggered connections of the windings of these elements is that a chalk-mark element is set to store "one" if a word is recorded in the next row of storage elements. These chalk-mark elements have the usual reading control windings, and it will be seen that reading the word in a given row reads the state of the chalk-mark element for that row, i.e. it "notifies" the circuit whether or not there is a word in the next row. Also there is a reset winding for all chalk-mark elements to which a pre-pulse PP is applied via amplifier IAC to initially reset the chalk-mark element to zero. This pre-pulse will be referred to later.

If necessary a reset-to-zero winding could be provided for all storage elements, this being controlled from the pre-pulse PP. This has not been shown to avoid unnecessarily complicating the drawing, but would be a winding threading all cores in such a way that a pulse on it when PP occurs sets them all to negative magnetisation. Information to be stored is received parallel-fashion over the leads marked 1, 2, 3, . . . *m* and each lead which bears a "one" sets the corresponding unit of static register SR. The outputs from the units of SR are applied to the bias wires B1—B*m* via the respective amplifiers. The pre-pulse PP is also applied to SR, and sets all units to zero, as does a pulse PWS whose origin will be described later, via delay circuit D1. These resettings will be referred to later.

It will be noted that in FIG. 2 the elements are each shown as a short diagonal rectangle crossing the leads representing the windings.

*Distributors*

Figure 1:
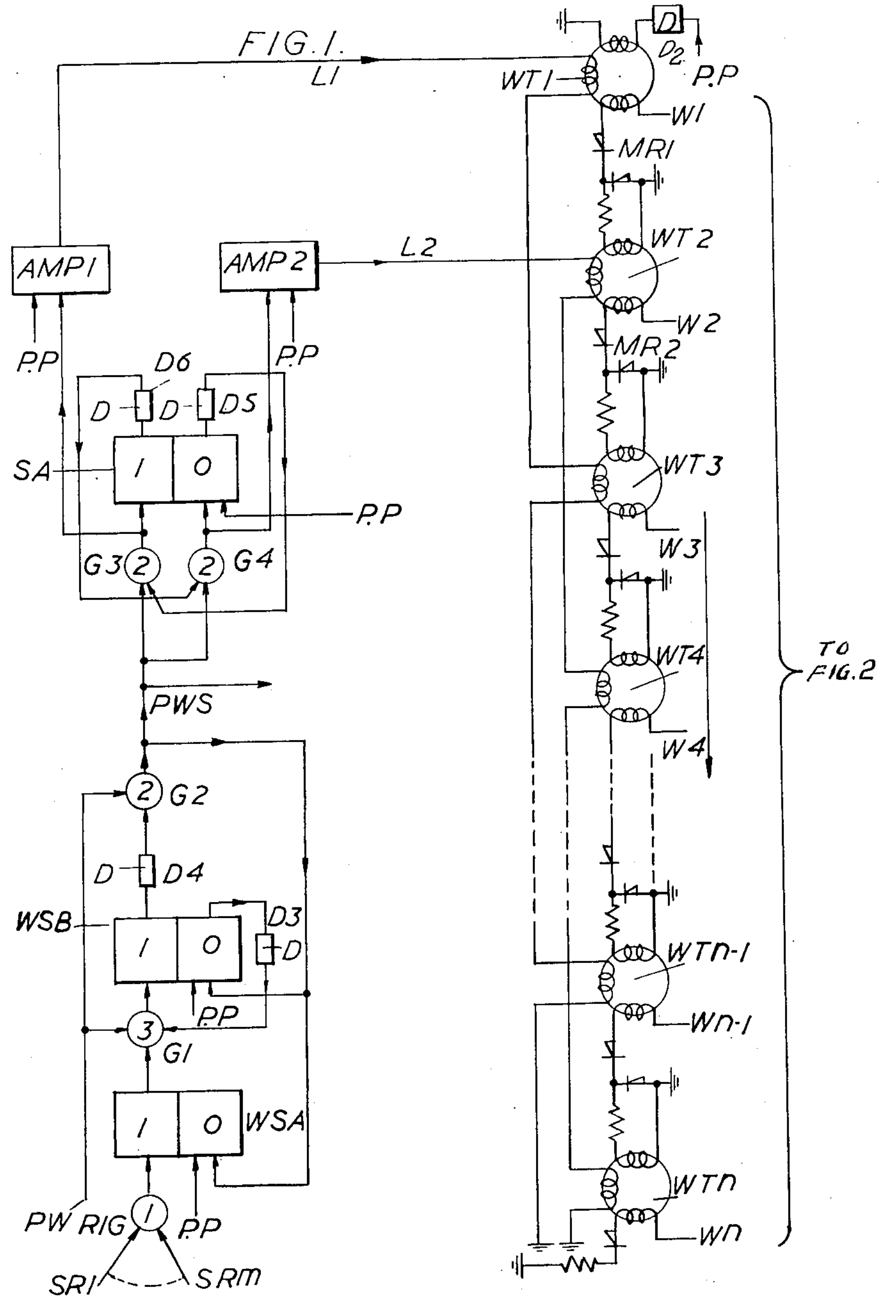
FIG. 1 shows circuits involved in the control of the insertion of data in the data processing equipment.

The recording distributor (FIG. 1) will first be described. This consists of a chain of magnetic cores each having three windings with interconnections between the cores. The circuit is actually a pattern movement register or shifting register, such as has been described by An Wang in Proc. I.R.E. vol. 39 No. 4 for April 1951, in which one core is set to one state (the operated state) hereinafter assumed to be of positive magnetisation and all other cores are in the other state (the non-operated state).

It will be assumed that initially the core WT1 is in a state of positive magnetisation, and the other cores are in a state of negative magnetisation. The cores have three windings each: an input winding, an output winding and a driving winding. The driving windings of all odd-numbered cores are connected in series and to a first pulse lead L1 and the driving windings of all evennumbered cores are connected in series and to a second pulse lead L2.

With the conditions set out above, a driving pulse on L1 whose polarity is such as to drive a core to negative magnetisation is applied over L1 to all odd-numbered cores. This sets WT1 from its initial positive state to its negative state so that a large pulse occurs in the output winding of WT1. This causes a current pulse to flow in the lead W1 in such a direction as to set storage elements of the matrix (FIG. 2) to positive magnetisation, but of about half the necessary amplitude to do this. A current pulse also flows via a rectifier MR1 in the input winding of WT2 which sets this core to its positive state. The change of state of this core has no effect on the next core WT3 because of rectifier MR2. Thus the "one" condition—the positive magnetisation—has been moved from WT1 to WT2, and this movement has energised the lead W1 to the first row of the matrix.

The next driving pulse occurs on the lead L2, and this sets WT2 from positive to negative magnetisation, causing the energisation of lead W2 to the second row of the matrix, and setting WT3 to positive. Each pulse on L1 or L2 steps the stored conditions along once, energizing the leads W1, W2, W3, . . . W*n* singly and successively.

The resetting of the distributor is effected by the pre-pulse PP which is produced by a suitable source, not shown. This is applied to both the distributor driving amplifiers AMP1 and AMP2 so that drive pulses occur on both L1 and L2. This has the effect of setting all of the cores to negative magnetisation if not already in that state. After a delay determined by the delay circuit D2 the pre-pulse is applied to the first core WT1 to set the latter to its positive state.

The operation of the reading distributor RT1 is similar to that of the recording distributor except that the output pulses to the matrix are of such a polarity and size as to set the storage elements to negative magnetisation.

An alternative form of static magnetic distributor could employ a ferro-magnetic switching matrix each element of which when selected energizes an output connection forming one of the control lead W1, . . . etc.

*Synchronising Circuits*

Figure 3:
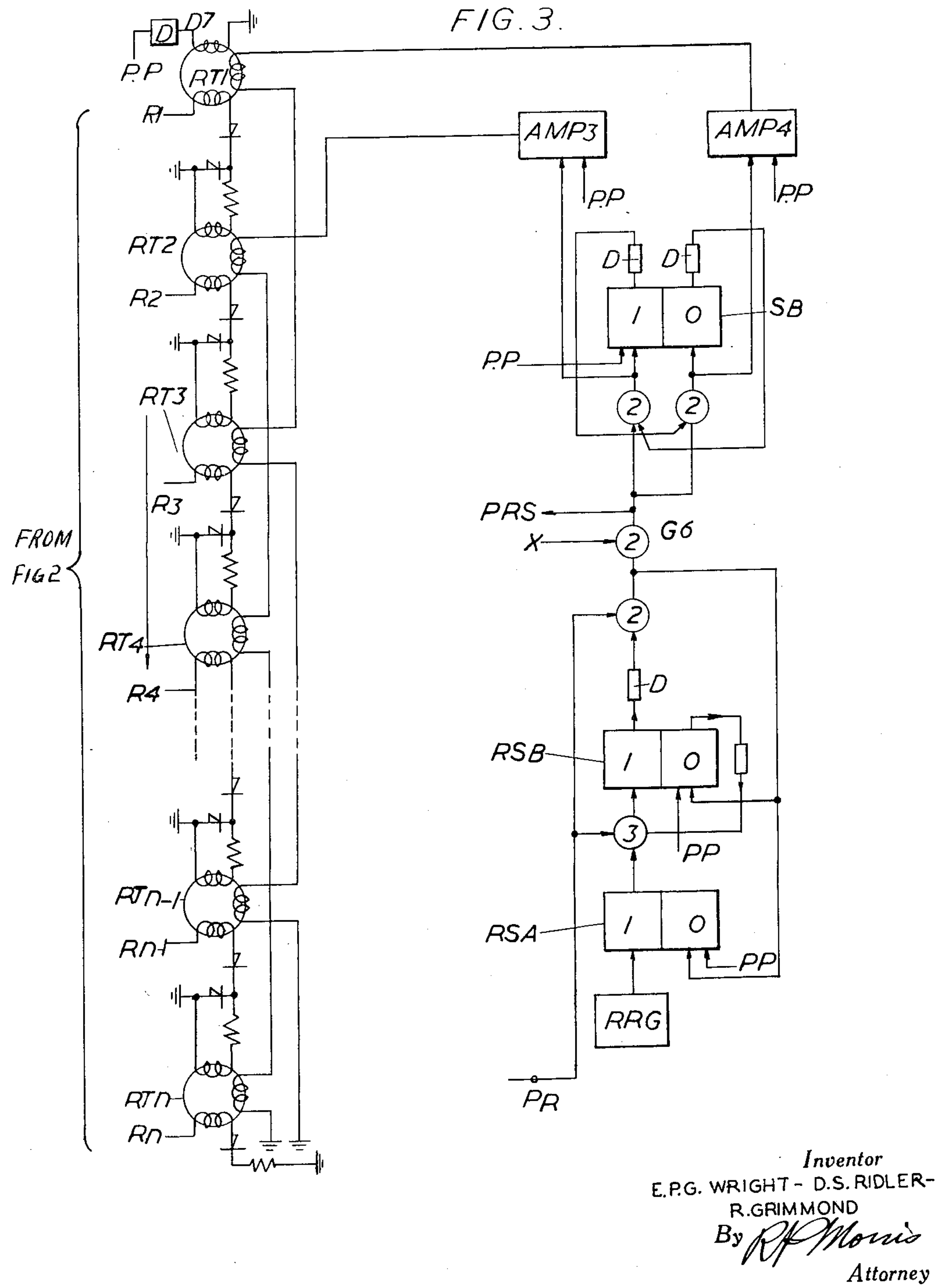
FIG. 3 shows circuits involved in the control of the extraction of data from the equipment.

There are two of these, WSA—WSB (FIG. 1) and RSA—RSB (FIG. 3), the former being for recording and the latter for reading. The only difference is that WSA—WSB is driven by pulses each occurring at the same time as an input binary number, while RSA—RSB is driven by pulses occurring at a constant predetermined rate from a reading rate generator RRG. The circuit elements WSA, WSB, RSA and RSB are bistable circuits each shown as two contiguous rectangles.

WSA—WSB will be described first. The pre-pulse PP sets WSA and WSB to their 0 conditions. When a word to be recorded occurs, an input gate RIG, which will be described later, delivers an output to WSA1 so WSA1 is operated, rendering WSA0 non-operated. The output of WSA1 energizes one control of a coincidence gate G1, which already has a second control energized from WSB0 via delay circuit D3. Therefore when a recording clock pulse P*w* from pulse source PGW (FIG. 2) occurs, G1 opens and applies a pulse to WSB1, which operates to render WSB0 non-operated. Since WSB1 is operated, one control of a gate G2 is energised via a delay circuit D4, so that the next P*w* pulse opens G2 to produce the pulse P*ws*, which is applied to the input of a splitting circuit SA to be described later.

In addition to being applied to the splitting circuit SA, P*ws* pulses are applied to the reading control circuit of FIG. 2 which includes a bistable circuit RC. P*ws* pulses are applied to WSA0 and WSB0, which are therefore both re-operated, rendering WSA1 and WSB1 non-operated. Hence the synchronising circuit is ready for the next input pulse received via RIG due to a number to be stored.

The synchronising circuit for reading is exactly the same in operation as that for recording, the only difference being that it is driven from the reading rate generator RRG, and the pulses gated out are labelled PRS, each being gated under the control of a reading clock pulse PR produced by the pulse generator PGR in FIG. 2. Recording and reading clock pulses are interleaved. This is indicated schematically in FIG. 2, where the two pulse generators PGR and PGW are represented schematically as blocks.

*Splitting Circuit*

There are two of these, SA for recording and SB for reading, which are identical except that SA is driven by P*ws* pulses and SB is driven by PRS pulses. These circuits are simple cross-gated binary pairs. Considering SA, and assuming that SA0 is operated, a control of gate G3 is energized from the output of SA0 via a delay circuit D5. Hence when a pulse P*ws*, which is applied to both G3 and G4, occurs, G3 gives an output which is applied to and operates SA1, rendering SA0 non-operated. The output from SA1, via delay circuit D6 prepares the gate G4 so that it will pass the next P*ws* pulse SA0. The pulse passed by G3 is also applied via an amplifier AMP1 to lead L1 to step the distributor. The next P*ws* pulse finds G4 open, so a pulse is applied to SA0 and reverses the state of SA to prepare G3 to respond to the next P*ws* pulse, and is also applied via AMP2 to L2 to step the distributor. Pulse PP is applied to both amplifiers AMP1 and AMP2 for resetting, as already described. SB is identical in operation to SA except that it is "driven" by PRS pulses, and so will not be described.

*Operational Description*

As already mentioned, data is received over the information input as a block of parallel-represented words and each block of words is preceded by a pre-pulse PP.

This pulse PP has the following effects, as already described:

(1) Resets the recording distributor (FIG. 1) to its rest condition by pulsing L1 and L2 via AMP1 and AMP2 to destroy the positive magnetisation in the recording distributor. After a delay set by D2, WT1 is set to its positively magnetised state.

(2) In a similar manner it restores the reading distributor to RT1 at positive magnetisation via AMP3 and AMP4 and D7.

(3) Clears the chalk mark storage elements by setting them all to zero, i.e. negatively magnetised.

(4) Restores WSA—WSB to WSA0 and WSB0 as a safety measure.

(5) Restores RSA—RSB to RSA0 and RSB0 as a safety measure.

(6) Clears the static register SR (FIG. 2).

(7) Sets SA to SA0 and SB to SB0.

Following the pre-pulse PP, the first word to be recorded is received on the information input, and this sets SR to hold the word, SR operating as a temporary store. Each rectangle of SR is a single bistable device which responds to a "one" or mark to energise its output lead to the appropriate one of the amplifiers feeding the bias wires B1—B*m*. The reception of this word will thus cause a positive output from at least one of the units of SR, so one or more of the controls of gate RIG (FIG. 1) are energised, causing the recording synchronising circuit to generate a P*ws* pulse. This pulse is applied via the delay circuit D1 (FIG. 2) to the static register SR which it resets, the delay due to D1 being such that the resetting occurs after the word has been placed in the storage matrix. P*ws* is also applied to a gate G5 (FIG. 2) whose other control is energised from RC0 of the reading control bistable device RC. This sets RC to RC1 after a delay set by D9. With RC at RC1, a condition is applied via a delay circuit D8 and a terminal X to a gate G6 (FIG. 3) which allows PRS pulses to pass from the reading synchronising circuit to the splitting circuit. The delay introduced by D8 is sufficient to ensure that the word causing the change-over of RC1 is recorded in the storage matrix.

To return to pulse P*ws*, this pulse is also applied to the splitting circuit SA—G3—G4, which causes lead L1 to be pulsed. This, as already described, shifts the positive magnetisation or "one" from core WT1 to WT2 of the distributor. As this occurs a current pulse on W1 "primes" all storage elements in the first row of the matrix. When this occurs, the elements whose bias wires B1, B2, B3 . . . B*m* are energised from SR via the amplifiers are set to their positive states to store binary one or mark. Hence the word has been recorded in the first row of the matrix. There is no "chalk-mark" for this row, and the pulse on W1 directly enables the reading control circuit by operating RC1 and rendering RC0 non-operated. The distributor has been stepped to its second position at the same time as the recording was effected.

After a delay determined by D1, as already mentioned, SR is cleared in readiness for the next word to be stored, and after the delay determined by D8, connected in the output circuit of RC1, the reading circuitry can function.

The second received word is set up in SR, placed in the second row of the matrix and SR cleared as before. However, the energisation of W2, which causes the recording, also sets the chalk-mark element in row No. 1 to its positive state. This condition serves to "tell" the control circuit that a word has been recorded in the next row of the matrix. Subsequently- received words are recorded in the matrix in successive rows in the same manner, each recording setting the chalk-mark element of the preceding row of elements.

When it is desired to read the stored intelligence at a predetermined rate, the generator RRG is switched on and this produces a train of pulses occurring at the rate at which the numbers are to be read. This is assumed to be slower than the pulse repetition rate of the clock pulses.

The synchronising circuit functions as already described to produce pulses PRS, but these can only be applied to the splitting circuit if G6 is open. This is only the case if reading is permissible, i.e. if there is anything in the matrix to read.

The first PRS pulse is applied via AMP3 to the odd-numbered cores of the reading distributor to transfer the recorded "one" from RT1 to RT2. This produces an energisation of the distributor output lead R1 as a result of which all matrix storage elements in which one is recorded are restored to zero, the pulses generated in the output windings due to this operation being applied to output leads via the amplifiers such as OA1. The small pulses due to elements in the zero state are not effective on these amplifiers. This PRS pulse is also applied to RC0 (FIG. 2) to restore the bistable circuit RC to RC0, in which state any further reading is prevented.

If the second row of the matrix contains a word, the chalk-mark element of the first row is at "one," and the pulse produced when this element is read is applied via amplifier OAC and a delay circuit D9 to RC1. This restores the circuit to the state in which reading is possible. The next PRS pulse passed by G6 steps the distributor from RT2 to RT3, causing the second stored word to be read and also causing RC to be reset to RC0. Once again RC will return to RC1 if there is a word in the next row of the matrix If the second row had not contained a word, the reading of the chalk-mark storage element would not have set RC to RC1, so that the supply of PRS pulses would be cut off. When a word is recorded in the second row in such a case, the P*ws* pulse under whose control the recording is effected sets RC to RC1 via D9 so that reading is again possible.

Thus as soon as the circuit RRG is switched on for reading, the stored words are read out singly and successively in parallel fashion, the reading circuit being disabled after each number is read. If the chalk-mark element which is read indicates that a word has been placed in the next row of the matrix, the reading circuit is re-enabled, while if it indicates that no word has been placed in the next row the reading circuit is left disabled until the next row is filled. Thus the reading circuit cannot get ahead of the recording. It is, of course, assumed that the rate of reading is such that all stored words can be read out before the next pre-pulse occurs.

It should be noted that although the data being stored at a random rate and re-transmitted at a steady rate is described as being a binary number, any other intelligence which can be expressed as a combination of marks (ones) and spaces (zeros) could be handled.

The system described above uses parallel recording and reading. However, serial recording and reading could be used. In this case when a word is to be recorded, the recording distributor is caused to energise the row winding for the group of elements in which that word is to be recorded for a period determined by the number of elements in that group. During this period the column windings are rendered effective one at a time at the element position rate for the word, each column winding being energised if the element to be recorded in that portion of the row is one. A suitable form of distributor for this would be an electronic tube circuit.

For reading serially, whether with serial or parallel recording, a convenient system would be to use two distributors, a row and a column distributor. Then the row distributor for the row to be read would energise that row's winding while the column distributor moved through a full cycle in which it pulsed reading windings for all columns singly and successively. The output could be obtained over a single common output winding. Hence for serial reading, two reading and on output winding per element are needed.

While the principles of the invention have been described above in connection with specific embodiments, and particular modifications thereof, it is to be clearly understood that this description is made only by way of example and not as a limitation on the scope of the invention.

What we claim is:

1. Data processing equipment which comprises a number of groups of storage elements, each element having two stable electrical states, a set of control wires, there being one individual to each group, a set of input wires, there being one for each plurality of corresponding elements in the several groups, whereby a word presented to all of said groups in parallel over said input wires can be recorded by energizing the control wire individual to the group in which said recording is to be effected to shift the storage elements of that group to a state characteristic of one of the digits of the word to be recorded, a distributor comprising a plurality of units, one of each group of storage elements, each said unit being connected to a respective one of said control wires and adapted when operated to energize said control wire, means responsive to reception of a word over said input wires to cause said distributor to energize the control wire corresponding to the group of storage elements in which said word is to be recorded, and means also responsive to reception of a word over said input wires simultaneously to transfer the operated condition in said distributor to the unit thereof corresponding to the group of storage elements in which the next word is to be recorded.

2. Data processing equipment which comprises a number of storage elements in which intelligence can be recorded as either one of two stable states, which storage elements form a number of groups in each of which a word may be recorded, means for recording a word in one of said groups of storage elements by applying electrical energy to the storage elements of that group such that each element of the group is in the appropriate state for the word to be recorded after the application of said energy, a distributor comprising a plurality of units having a unit for each group of storage elements, means for blocking the operation of all the other units when any one of said units is operated, means responsive to reception of a word to be recorded to cause said recording means to record that word in the group of storage elements corresponding to the operated unit of said distributor, and means controlled by said recording means and responsive to reception of a word simultaneously to transfer the operated condition in said distributor to the unit corresponding to the group of storage elements in which the next word is to be recorded.

3. Data processing equipment, as claimed in claim 2, in which each said storage element is a single ferro-magnetic storage element; in which said recording means comprises a control wire per group of storage elements which threads all elements of its group so as to form a control winding for each element of that group, and further control wires equal in number to the number of digital positions in a word and each of which threads one storage element in each group so as to form control windings therefor; and in which the means responsive to the receipt of a word to be recorded energizes a combination of said further control wires which represents that word, and the transfer means also responsive to reception of a word causes the energisation of the control wire for the group of elements in which that word is to be recorded, each storage element whose control wires are both energised being set to one stable state and the other storage elements each being left in the other stable state.

4. Data processing equipment, as claimed in claim 3, in which said distributor comprises a number of interconnected magnetic cores, one per unit, each of which can be set to a first or a second stable magnetic state, said first state being the operated state and said second state being the non-operated state, and each of which has a driving winding, an input winding and an output winding; in which the output winding of a core is serially connected to the input winding of the next core of the distributor and to the control wire for the corresponding group of said storage elements; and in which said means responsive to reception of a word comprises means for applying a pulse to the driving winding of the operated core of the distributor for rendering that core non-operated, and means for applying the output from the output winding of that core due to said change of state to the next core of the distributor to render said next core operated and for applying a pulse to the control wire for the corresponding group of storage elements to cause said word to be recorded.

5. Data processing equipment which comprises a number of groups of storage elements in one or more of which groups words are recorded, said storage elements having two stable electrical states, the storage elements of each group in which a word is recorded being in that one of said two states which characterises one of the digits of that word, a reading control wire for each group of elements connected to each element in the group, means for reading a recorded word by energising the reading control wire individual to the group of storage elements from which the word is to be read, means responsive to the energisation of said control wire to cause an output pulse to be produced from each storage element which is in one of said states when said energisation occurs and substantially no output from each storage element which is in the other of said states when said energisation occurs, the combination of output pulses produced as a result of said energisation forming the reading output, a reading distributor having a unit for each group of storage elements connected with the associated reading control wire, means responsive to the recording of a word in a group of storage elements for producing a reading signal, means responsive to reception of said reading signal to energise the control wire corresponding to a unit of said distributor in operated condition, and means also responsive to reception of a reading signal simultaneously to transfer the operated condition of said distributor to the unit corresponding to the group of storage elements to be read in response to the next reading signal.

6. Data processing equipment, as claimed in claim 2, comprising means for reading a recorded word by applying electrical energy to the elements of the group of storage elements in which that word is recorded for directing each element of that group towards a predetermined state, means responsive to the change of state of each element for producing an output pulse from each element whose state is changed by said reading and substantially no output pulse from each element whose condition is not changed by said reading, the combination of output pulses produced as a result of said reading forming the reading output, a second distributor comprising a plurality of units of which there is one unit for each said group, means for blocking the operation of all other units when any one unit is operated, means connecting each unit with its associated group of storage elements so that electrical energy may be applied to the elements of said group when said unit is operated, a source of reading signals, means for causing said signal source to produce a signal upon the receipt of a word by said recording means, means responsive to a signal from said source to cause said reading means to read the word in the group corresponding to the operated unit of said second distributor, and means also responsive to a signal from said source simultaneously to transfer the operated condition in said distributor to the unit corresponding to the group of storage elements to be read in response to the next reading signal.

7. Intelligence storage equipment, as claimed in claim 6, in which each storage element is a single ferro-magnetic storage element; in which said reading means comprises a reading control wire for each group of storage elements which threads all elements of its group so as to form a control winding for each element of the group, and a number of output wires equal in number to the number of digital positions in a word and each of which threads one storage element in each group so as to form output windings therefore; and in which the means responsive to the signal from the source of reading signals includes means controlled thereby for energising the control wire for the group of storage elements to be read next, thereby directing each element of that group towards the predetermined state and causing an output pulse to be produced across the output windings of such of said storage elements as are changed by said reading.

8. Intelligence storage equipment, as claimed in claim 7, in which said second distributor comprises a number of interconnected magnetic cores, one per unit, each of which is settable to a first or a second stable magnetic state, said first state being the operated state and said second state being the non-operated state, and each of which has a driving winding, an input winding and an output winding; in which the output winding of a core is connected to the input winding of the next core of the second distributor and to the control windings for the corresponding group of said storage elements; and in which the means responsive to the reading signal includes means for causing a pulse to be applied to the driving winding of the operated core of the second distributor which renders that core non-operated, means for applying the output from the output winding of that core, caused by the change of state, to the next core of the second distributor to operate that next core and to the control windings of the corresponding group of storage elements to cause said word to be read.

9. Intelligence storage equipment, as claimed in claim 6, and in which said recording means and said reading means for the storage elements are wholly separate one from another.

10. Intelligence storage equipment, as claimed in claim 9, and which comprises an additional storage element in each said group of storage elements, means controlled by the recording means for operating each additional storage element to one state when a word is recorded in the next group of storage elements, means responsive to the reading of a word to determine the state of said additional element of the group at the time of said reading, and means responsive to an indication from said additional element that there is no word in the next group of storage elements for preventing the supply of a reading signal to said distributor.

11. Intelligence storage equipment comprising a plurality of storage elements arranged in groups, receiving means for receiving a word to be recorded, means controlled by said receiving means for recording a word received by said receiving means in one of said groups of storage elements and for recording successive received words in successive groups of said storage elements, a source of reading signals, reading means responsive to signals from said source of reading signals for reading said groups of storage elements in succession, means operated by said reading means for indicating each time a group of storage elements is read whether a word has been recorded in the next succeeding group of storage elements, and means responsive to said indicating means indicating that no word has been recorded in said next succeeding group of storage elements for inhibiting said reading means.

12. Intelligence storage equipment comprising a plurality of storage elements arranged in groups, each storage element having two stable states, separate input means connected to corresponding elements of all of said groups, whereby a word to be recorded may be presented to all said groups in parallel by applying signals representing said word to said input means, separate recording control means for each group of elements connected to all the elements of the group, a recording distributor comprising a plurality of units, one for each group of storage elements, means for respectively connecting said units of said recording distributor to said recording control means, means responsive to the receipt of a word for applying signals representing said word to said separate input means, said signals having insufficient strength to shift the state of said elements from a predetermined state to the other, means also responsive to the receipt of said word for applying a signal to the recording control means associated with an operated unit of said recording distributor of such strength that, in cooperation with the signal applied to the input means connected to an element of the group, that element will shift from said predetermined state to said other state, whereby said word will be recorded in said group of elements, a reading distributor comprising a plurality of units, one for each group of storage elements, separate reading control means for each group of storage elements connected to all the elements of the group, means for respectively connecting said units of said reading distributor to said reading control means, a source of reading signals, means responsive to a signal from said source of reading signals for applying a reading signal to the reading control means connected to an operated unit of said distributor of such strength and polarity as to shift the state of any of the storage elements in the associated group from said other state to said predetermined state, a plurality of outputs, there being one for each element in a group connected to all the corresponding elements of all the groups, means for creating a signal pulse on an output when a storage element connected thereto is shifted from said other state to said predetermined state, means also responsive to a signal from said source of reading signals for operating another unit of said reading distributor which is connected to the next group of storage elements to be read and rendering the previously operated unit unoperated, means responsive to a reading signal applied to a reading control means connected to a group of storage elements for indicating whether a word has been stored in the next group of storage elements to be read, and means responsive to said indicating means for preventing a signal from said source of reading signals from reaching either of said means responsive thereto if said indicating means indicates that no word has been recorded in said next group of storage elements.

References Cited in the file of this patent

UNITED STATES PATENTS

| | | |
|---|---|---|
| 2,691,157 | Stuart-Williams | Oct. 5, 1954 |
| 2,708,267 | Weidenhammer | May 10, 1955 |
| 2,734,182 | Rajchman | Feb. 7, 1956 |
| 2,734,185 | Warren | Feb. 7, 1956 |
| 2,816,169 | Pawley | Dec. 10, 1957 |
| 2,832,951 | Browne | Apr. 29, 1958 |
| 2,882,517 | Warren | Apr. 14, 1959 |
| 2,902,677 | Counihan | Sept. 1, 1959 |
| 2,931,014 | Buchholz | Mar. 29, 1960 |

OTHER REFERENCES

"A Concident-Current Magnetic Memory Cell for the Storage of Digital Information (Papian), Proceedings of I.R.E., April 1952, pp. 475 to 478 (Fig. 2, page 475 relied on).

"Magnetic Elements in Arithmetic and Control Circuits," (Auerbach) Electrical Engineering, September 1955, pages 766 to 770 (Fig. 4, page 768 relied on).